INVENTORS.
George E. Ham
Benjamin V. Alcala
Guy H. Harris
BY L. Wayne White
AGENT

United States Patent Office 3,772,345
Patented Nov. 13, 1973

3,772,345
PROCESS FOR PREPARING N-ALKYLTHIOALKYL-O-ALKYLTHIOCARBAMATES AND N-ALKYL-THIOALKYL-O-ALKYLCARBAMATES
George E. Ham and Benjamin V. Alcala, Lake Jackson, Tex., and Guy H. Harris, Concord, Calif., assignors to The Dow Chemical Company, Midland, Mich.
Filed Sept. 8, 1970, Ser. No. 70,399
Int. Cl. C07c 155/08
U.S. Cl. 260—455 A          9 Claims

ABSTRACT OF THE DISCLOSURE

Compounds of the formula

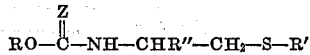

Figure 1:
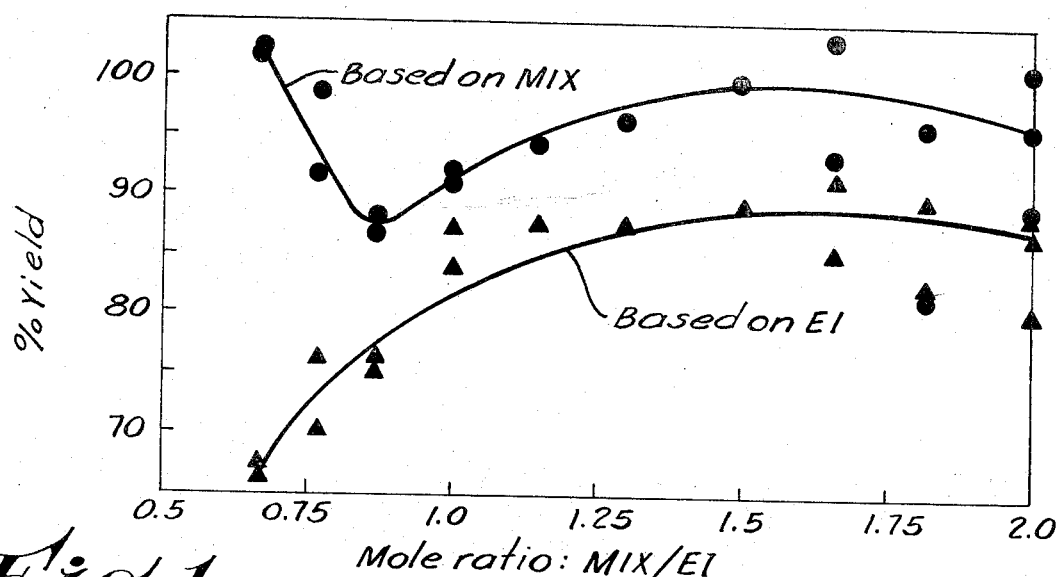

wherein Z is oxygen or sulfur, R and R' are hydrocarbyl radicals and R" is hydrogen or lower alkyl, are prepared in the novel process comprising reacting (a) a compound of the formula

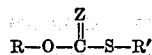

with (b) an aziridine of the formula

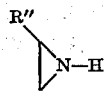

The compounds are useful in the flotation of sulfide ores.

BACKGROUND OF THE INVENTION

The use of the title compounds as flotation agents in the recovery of metal values from sulfide ores was set forth in a commonly owned U.S. patent application, Ser. No. 799,119, entitled "Flotation of Sulfide Ores," filed Feb. 13, 1969. It is now U.S. Pat. 3,590,999.

SUMMARY OF THE INVENTION

The invention is a process for preparing compounds represented by the formula

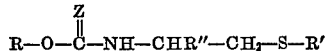

wherein Z is oxygen or sulfur; R is alkyl, cycloalkyl or aralkyl or preferably from 1 to about 8 carbon atoms; R' is alkyl, cycloalkyl, aralkyl or aryl of preferably from 1 to about 8 carbon atoms; and R" is hydrogen or lower alkyl of from 1 to about 4 carbon atoms. The novel process comprises reacting (a) a compound of the formula

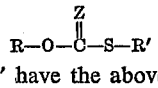

wherein Z, R and R' have the above meaning, with (b) an aziridine of the formula

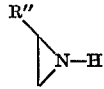

wherein R" has the above meaning. The process is preferably conducted in the presence of a tertiary amine catalyst.

The novel process is a facile, exothermic reaction which is typically conducted by merely mixing the reactants, (a) and (b) above, together. The products are obtained in excellent yields.

The stoichiometry of the reaction requires 1 mole of (a) per mole of (b), but an excess of either reactant may be used. Typically, the molar ratio of (a):(b) in the process is from about 5:1 to about 1:5, and preferably is from 1.5:1 to 1:1.5.

The reaction temperature is suitably from about 0° C. up to the decomposition temperature of the product. In most instances, about 180° C. is a practical upper limit. At temperature of from about 20° C. to about 80° C. is preferred. The reaction temperature may be conveniently regulated by the rate of addition of one of the reactants to the reaction mixture, preferably the aziridine reactant.

The reaction pressure is not critical and may be varied to convenience. Atmospheric or superatmospheric pressures typically used.

The reaction is preferably conducted in liquid phase.

The reaction rate is generally high. Reaction times of from about 5 minutes to about 5 hours are generally sufficient for the reaction to proceed to substantial completion.

The reaction is preferably conducted in the presence of a catalytic amount of a tertiary amine. Such amines include trialkyl amines, such as trimethyl-, triethyl-, tributyl-, trihexylamine, and the like; heterocyclic amines, such as N-methylmorpholine, N,N'-diethylpiperazine, pyridine; weak-base, anion exchange resins, such as the condensation polymers of epichlorohydrin and ammonia; aralkyl amines, such as tribenzylamine, N,N-dimethylaniline, benyl dibutylamine; and other like amines. Such amines, when present, are usually included in amounts of from about 0.1 to about 15 percent by weight, total reactant basis.

SPECIFIC EMBODIMENTS

The following examples further illustrate the invention.

EXAMPLE 1
N-methylthioethyl-O-isopropylthiocarbamate

Several runs were conducted wherein ethylenimine (EI) was added to a mixture of methyl isopropyl xanthate (MIX) and triethylamine (TEA). The process parameters and experimental results are set forth in FIGS. 1–3 and in the discussion below. Experimental results are expressed as percent yield of product based on converted reactant, either MIX or EI.

In FIG. 1, the mole ratio of EI/TEA was 10, the reaction temperature was maintained at about 60° C. for a total reaction time of 2 hours. The process variable was the mole ratio of MIX/EI.

Figure 2:
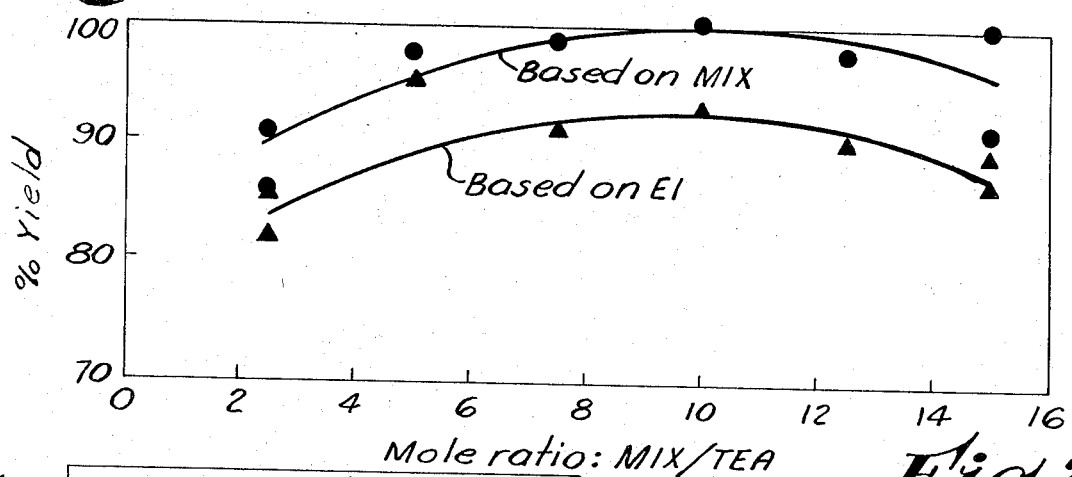

In FIG. 2, the mole ratio or MIX/EI was 1.5, the reaction temperature was maintained at about 60° C. for a total reaction time of 2 hours. The process variable was the mole ratio of MIX/TEA.

Figure 3:
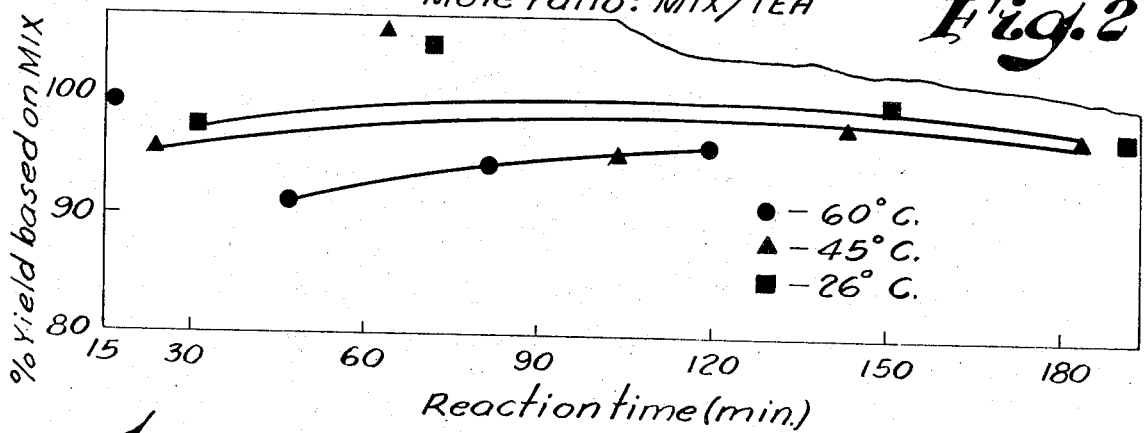

In FIG. 3, the mole ratio of MIX/EI was 1.5 and the mole ratio of MIX/TEA was 10. The process variable was time at three temperatures.

The following experiments are conducted in like manner and in accordance with the equation

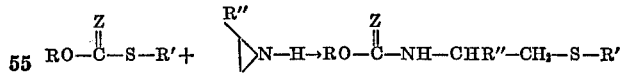

| Ex. No. | Xanthate reactant | | | Azairidine Reactant R" |
|---|---|---|---|---|
| | Z | R | R' | |
| 2 | O | CH₃ | CH₃ | H |
| 3 | O | CH₃ | n-C₄H₉ | H |
| 4 | O | CH₃ | CH₂C₆H₅ | CH₃ |
| 5 | O | C₂H₅ | C₂H₅ | H |
| 6 | S | C₂H₅ | C₆H₅ | H |
| 7 | S | C₄H₉ | n-C₅H₁₃ | H |
| 8 | O | C₄H₉ | C₂H₅ | C₂H₅ |
| 9 | O | n-C₅H₁₃ | C₂H₄C₆H₅ | CH₃ |
| 10 | O | n-C₅H₁₃ | i-C₃H₇ | H |
| 11 | O | C₈H₁₇ | i-C₃H₇ | H |
| 12 | S | C₈H₁₇ | p-CH₂C₆H₄CH₃ | H |
| 13 | O | Cyclohexyl | Cyclohexyl | H |
| 14 | S | do | i-C₃H₇ | CH₃ |
| 15 | O | CH₂C₆H₅ | CH₂C₆H₅ | H |
| 16 | O | CH₂C₆H₅ | n-C₆H₁₃ | C₄H₉ |
| 17 | O | C₂H₄C₆H₅ | CH₃ | H |
| 18 | O | C₂H₄C₆H₅ | C₆H₅ | H |
| 19 | S | CH₂C₆H₄CH₃ | n-C₃H₇ | CH₃ |
| 20 | O | CH₂C₆H₄CH₃ | n-C₄H₉ | H |

The products are flotation agents.

We claim:

1. A process for preparing a compound of the formula

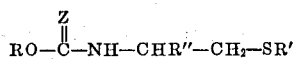

wherein Z is oxygen or sulfur; R and R' are hydrocarbyl radicals wherein R is alkyl, cycloalkyl or aralkyl and R' is alkyl, cycloalkyl, aralkyl or aryl; and R" is hydrogen or lower alky, comprising reacting by contacting at a temperature of from about 0° C. up to the decomposition temperature of the product (a) a compound of the formula

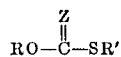

wherein Z, R and R' have the above meaning with (b) an aziridine of the formula

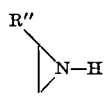

having the above meaning.

2. The process defined in claim 1 wherein the molar ratio of (a):(b) is from 5:1 to 1:5.

3. The process defined in claim 1 wherein the molar ratio of (a):(b) is from 1.5:1 to 1:1.5.

4. The process defined in claim 1 wherein said process is conducted in the presence of a catalytic amount of a tetriary amine catalyst.

5. The process defined in claim 1 wherein Z is sulfur.

6. The process defined in claim 1 wherein R is alkyl, cycloalkyl or aralkyl of from 1 to about 8 carbon atoms, and R' is alkyl, cycloalkyl, aralkyl or aryl of from 1 to about 8 carbon atoms.

7. The process defined in claim 1 wherein R" is hydrogen.

8. The process defined in claim 1 wherein said temperature is from about 20° C. to about 80° C.

9. The process defined in claim 8 wherein Z is sulfur, R is isopropyl, R' is methyl, R" is hydrogen; the molar ratio of (a):(b) is from 1.5:1 to 1:1.5; and said process is conducted in the presence of a catalytic amount of triethylamine.

References Cited

UNITED STATES PATENTS

| | | | |
|---|---|---|---|
| 2,785,191 | 3/1957 | Schwyzer | 260—455 A |
| 3,410,893 | 11/1968 | Levine | 260—481 C |
| 2,824,857 | 2/1958 | Dreschel | 260—77.5 |
| 3,436,305 | 4/1969 | Maher | 117—156 |

FOREIGN PATENTS

| | | | |
|---|---|---|---|
| 718,063 | 11/1954 | Great Britain | 260—561 |
| 1,942,676 | 3/1970 | Germany | 260—455 A |

LEWIS GOTTS, Primary Examiner

G. HOLLRAH, Assistant Examiner

U.S. Cl. X.R.

209—166; 260—455 B, 468 C, 470, 481 C

PO-1050
(5/69)

UNITED STATES PATENT OFFICE
CERTIFICATE OF CORRECTION

Patent No. 3,772,345            Dated November 13, 1973

Inventor(s) George E. Ham, Benjamin V. Alcala and Guy H. Harris

It is certified that error appears in the above-identified patent and that said Letters Patent are hereby corrected as shown below:

Col. 2, line 10:   Insert --are-- between "sures" and "typically".

Col. 2, line 23:   Change "benyl" to --benzyl--.

Claim 1, Col. 3, line 10:   Change "alky," to --alkyl,--.

Claim 1, Col. 3, line 24:   Insert --R"-- before "having".

Col. 4, line 20:   Change "Dreschel" to --Drechsel--.

Signed and sealed this 3rd day of December 1974.

(SEAL)
Attest:

McCOY M. GIBSON JR.           C. MARSHALL DANN
Attesting Officer             Commissioner of Patents